US009964336B2

(12) United States Patent
Kraft

(10) Patent No.: US 9,964,336 B2
(45) Date of Patent: May 8, 2018

(54) METHOD OF OPERATING A SOLAR TRACKING APPARATUS

(75) Inventor: Steven M. Kraft, Albany, CA (US)

(73) Assignee: SunPower Corporation, San Jose, CA (US)

( * ) Notice: Subject to any disclaimer, the term of this patent is extended or adjusted under 35 U.S.C. 154(b) by 1356 days.

(21) Appl. No.: 12/796,875

(22) Filed: Jun. 9, 2010

(65) Prior Publication Data

US 2011/0303213 A1 Dec. 15, 2011

(51) Int. Cl.
| | |
|---|---|
| F24J 2/38 | (2014.01) |
| F24J 2/54 | (2006.01) |
| H02S 20/00 | (2014.01) |
| H02S 20/32 | (2014.01) |
| F24J 2/46 | (2006.01) |

(52) U.S. Cl.
CPC .............. *F24J 2/38* (2013.01); *F24J 2/5413* (2013.01); *H02S 20/00* (2013.01); *H02S 20/32* (2014.12); *F24J 2/4638* (2013.01); *F24J 2200/04* (2013.01); *Y02E 10/47* (2013.01); *Y02E 10/50* (2013.01)

(58) Field of Classification Search
CPC ...................................................... F24J 2/38
USPC ........................................ 126/574, 601, 578
See application file for complete search history.

(56) References Cited

U.S. PATENT DOCUMENTS

| | | | | |
|---|---|---|---|---|
| 4,287,411 | A * | 9/1981 | Beucci | 250/203.4 |
| 4,632,091 | A | 12/1986 | Wiens | |
| 4,868,379 | A * | 9/1989 | West | 250/203.4 |
| 5,305,613 | A * | 4/1994 | Hotta | B60H 1/00392 180/65.1 |
| 7,380,549 | B1 * | 6/2008 | Ratliff | 126/605 |
| 7,430,077 | B2 * | 9/2008 | Briee et al. | 359/591 |
| 2003/0062037 | A1 * | 4/2003 | Hayden et al. | 126/570 |
| 2007/0102037 | A1 * | 5/2007 | Irwin | 136/246 |
| 2008/0295825 | A1 | 12/2008 | Kleinwachter | |
| 2009/0038668 | A1 * | 2/2009 | Plaisted | 136/244 |
| 2009/0114211 | A1 * | 5/2009 | Homyk et al. | 126/578 |

(Continued)

FOREIGN PATENT DOCUMENTS

| | | |
|---|---|---|
| JP | 01-300163 | 12/1989 |
| JP | 2002-250566 | 9/2002 |
| JP | 2005-101103 | 4/2005 |

OTHER PUBLICATIONS

International Search Report and Written Opinion from PCT/US2011/037209 dated Feb. 21, 2012, 9 pgs.

(Continued)

*Primary Examiner* — Gregory Huson
*Assistant Examiner* — Aaron Heyamoto
(74) *Attorney, Agent, or Firm* — Schwabe, Williamson & Wyatt, P.C.

(57) ABSTRACT

Methods of operating solar tracking apparatuses are described. For example, a method includes determining a minimum amount of energy required to move the solar tracking apparatus from a first position to a second position. An available radiance is estimated for a solar resource coupled to the solar tracking apparatus. The solar tracking apparatus is moved from the first position to the second position prior to a point in time when the energy derivable from the available radiance is less than the minimum amount of energy required to move the solar tracking apparatus from the first position to the second position.

14 Claims, 3 Drawing Sheets

(56) References Cited

U.S. PATENT DOCUMENTS

2009/0188488 A1*  7/2009  Kraft et al. .................. 126/601
2011/0308575 A1* 12/2011  Guillemette ................. 136/246

OTHER PUBLICATIONS

International Preliminary Report on Patentability from PCT/US2011/037209 dated Dec. 20, 2012, 6 pgs.

* cited by examiner

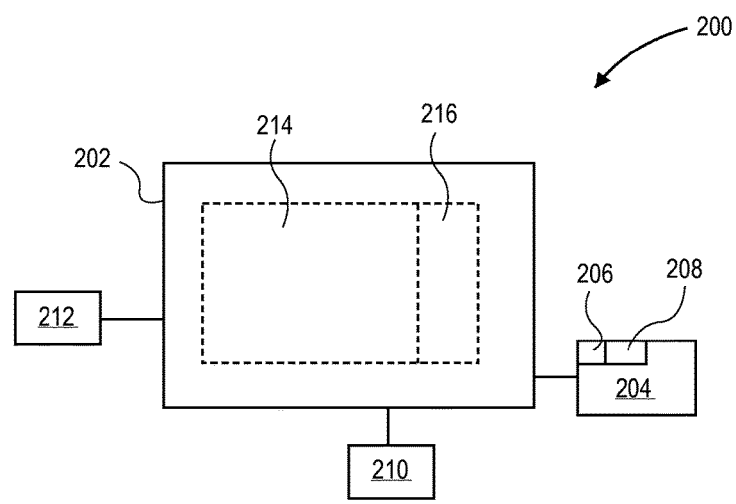
FIG. 2A
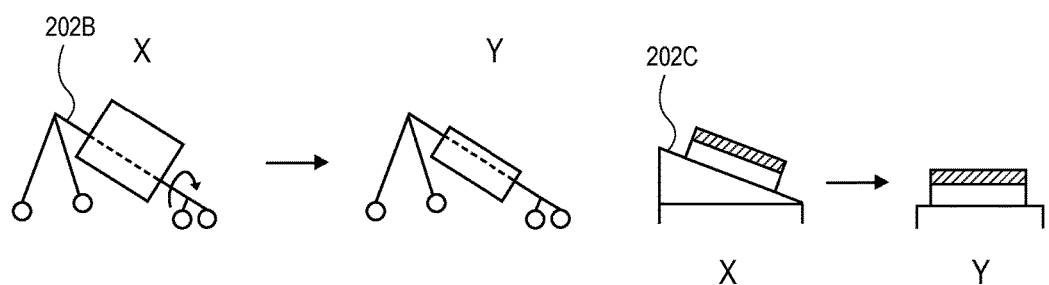
FIG. 2B　　　FIG. 2C

METHOD OF OPERATING A SOLAR TRACKING APPARATUS

TECHNICAL FIELD

Embodiments of the present invention are in the field of renewable energy and, in particular, methods of operating solar tracking apparatuses.

BACKGROUND

In the solar power industry, the wiring of alternating current (AC) power to tracker controllers may be problematic and costly. As tracker blocks get smaller, this problem may be exacerbated due to demands for increased wiring and switchgear density. A simpler and less costly power source for a solar tracker may be a situation where the solar power is mounted on the tracker itself. Trackers powered in this fashion are available today, however, they all appear to suffer from a lack of solution for returning the payload to a stow position in the event of bad weather. This issue may conventionally be addressed by adding a battery backup to the controller. However, the addition of a battery and a charge controller to each motor (e.g. for each tracker or for a grouping of trackers) can be costly and may reduce reliability.

BRIEF DESCRIPTION OF THE DRAWINGS

FIG. 2A illustrates a block diagram of a solar tracking apparatus, in accordance with an embodiment of the present invention.

FIG. 2B illustrates a solar tracking apparatus moved from a first position, X, to a second position, Y, in accordance with an embodiment of the present invention.

FIG. 2C illustrates a solar tracking apparatus moved from a first position, X, to a second position, Y, in accordance with an embodiment of the present invention.

DETAILED DESCRIPTION

Figure 1:
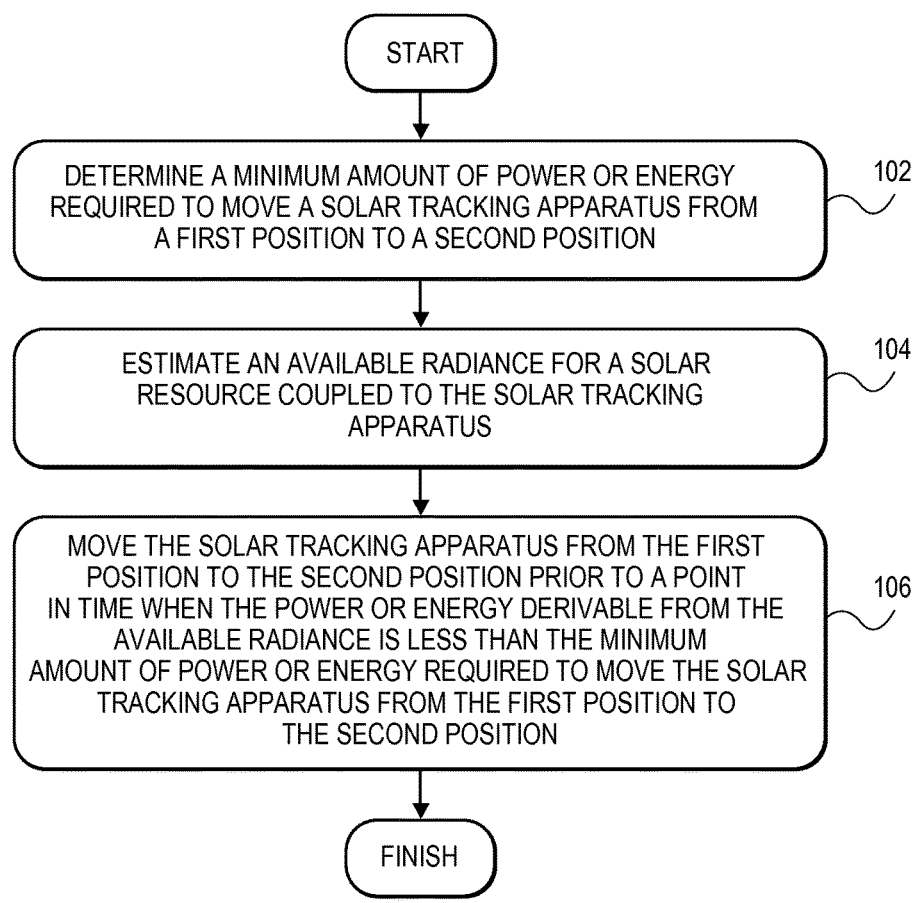
FIG. 1 illustrates a flowchart representing operations in a method of operating a solar tracking apparatus, in accordance with an embodiment of the present invention.

Methods of operating solar tracking apparatuses are described herein. In the following description, numerous specific details are set forth, such as specific approaches to orientation of a tracker, in order to provide a thorough understanding of the present invention. It will be apparent to one skilled in the art that embodiments of the present invention may be practiced without these specific details. In other instances, well-known data collection techniques, such as insolation data collection, are not described in detail in order to not unnecessarily obscure embodiments of the present invention. Furthermore, it is to be understood that the various embodiments shown in the Figures are illustrative representations and are not necessarily drawn to scale.

Disclosed herein are methods of operating solar tracking apparatuses. In one embodiment, a method includes determining a minimum power level and a minimum amount of energy required to move the solar tracking apparatus from a first position to a second position. An available radiance is estimated for a solar resource coupled to the solar tracking apparatus. The solar tracking apparatus is moved from the first position to the second position prior to a point in time when (a) the power level provided by the available radiance drops below the minimum power level required to move the solar tracking apparatus or (b) the energy derivable from the available radiance is less than the minimum amount of energy required to move the solar tracking apparatus from the first position to the second position.

Also disclosed herein are solar tracking apparatuses. In one embodiment, an apparatus includes a solar tracking apparatus and a module coupled to the solar tracking apparatus. The module is configured to perform a method, the method including determining a minimum power level or a minimum amount of energy required to move the solar tracking apparatus from a first position to a second position. The method also includes estimating an available radiance for a solar resource coupled to the solar tracking apparatus. The method also includes moving the solar tracking apparatus from the first position to the second position prior to a point in time when (a) the power level provided by the available radiance drops below the minimum power level required to move the solar tracking apparatus or (b) the energy derivable from the available radiance is less than the minimum amount of energy required to move the solar tracking apparatus from the first position to the second position.

Also disclosed herein are machine-accessible storage media having instructions stored thereon which cause a data processing system to perform a method of operating a solar tracking apparatus. In one embodiment, a machine-accessible storage medium has instructions stored thereon which cause a data processing system to perform a method including determining a minimum power level or a minimum amount of energy required to move the solar tracking apparatus from a first position to a second position. An available radiance is estimated for a solar resource coupled to the solar tracking apparatus. The solar tracking apparatus is moved from the first position to the second position prior to a point in time when (a) the power level provided by the available radiance drops below the minimum power level required to move the solar tracking apparatus or (b) the energy derivable from the available radiance is less than the minimum amount of energy required to move the solar tracking apparatus from the first position to the second position.

In accordance with an embodiment of the present invention, a solar powered tracking system is supplied with a weather forecast in an arrangement suitable to avoid situations where a solar module might remain positioned in a non-stow position when direct current (DC) power is not available. In one embodiment, the operation of such a weather forecast feature includes configuring a controller with a capability to determine, at any given time, a time factor for stowing a solar array from a real time current position. In a specific embodiment, provided with the weather forecast information in combination with information regarding the motor and mechanism for moving a supporting tracker apparatus, the controller can be used to estimate the amount of power or energy required to stow the system (e.g., to orient a supported solar module in a safe position).

Using the weather forecast, the controller may be used to estimate how much power or energy is available in the near future from a solar resource (e.g., estimate how much insolation will be available from solar radiation before the end of daytime). In an embodiment, based on the above factors, the controller is used to determine a need to stow a solar module to prevent the case where the system is not stowed when the solar resource is removed (e.g., at night fall). In an embodiment, such an arrangement reduces or obviates the need for a battery and charge controller for a solar powered solar tracker. In an embodiment, a solar module is stowed in a safe position prior to the need to be stowed in a safe position, and at a time when enough power can be generated on-board to still achieve the stowed position.

In an aspect of the present invention, methods are provided for operating solar tracking apparatuses. FIG. 1 illustrates a flowchart 100 representing operations in a method of operating a solar tracking apparatus, in accordance with an embodiment of the present invention.

Referring to operation 102 of flowchart 100, a method of operating a solar tracking apparatus includes determining a minimum power level or a minimum amount of energy required to move the solar tracking apparatus from a first position to a second position.

Referring to operation 104 of flowchart 100, the method of operating a solar tracking apparatus further includes estimating an available radiance for a solar resource coupled to the solar tracking apparatus.

In accordance with an embodiment of the present invention, the solar tracking apparatus supports one or more modules of concentrator solar cells, and the solar resource includes one or more non-concentrator solar cells also coupled to the solar tracking apparatus. Although, in an alternative embodiment, the solar resource includes one or more concentrator solar cells, and the solar tracking apparatus supports only solar cells of the concentrator type. In an embodiment, the second position is a stow position. In an embodiment, the estimating includes the use of weather prediction techniques. In one embodiment, a weather prediction is communicated to a receiver coupled to the solar tracking apparatus. In a specific embodiment, the weather prediction is communicated by using a mesh network.

Referring to operation 106 of flowchart 100, the method of operating a solar tracking apparatus further includes moving the solar tracking apparatus from the first position to the second position prior to a point in time when either (a) the power available from the available radiance or (b) the energy derivable from the available radiance is less than the minimum amount of power or energy required to move the solar tracking apparatus from the first position to the second position.

It is to be understood that for back-up situations, a back-up power supply such as a battery may still be included with the tracking apparatus. As such, in an embodiment, the solar tracking apparatus is coupled to an auxiliary power source module. However, this need not be the case, and certain arrangements may not be able to accommodate the extra overhead involved with a back-up power supply. As such, in an alternative embodiment, the solar tracking apparatus is not equipped with an auxiliary power source module.

As noted above, in an embodiment, the weather prediction is communicated by using a mesh network. In one embodiment, an apparatus for wireless mesh networking of solar tracking devices is provided. These embodiments provide bi-directional communication from a host computer to solar tracking controllers that allows control and status information to be exchanged between the host and the solar tracking controllers. This bi-directional communication may allow status information from actuators, sensors, and algorithms located in a plurality of solar tracking controllers to be available to the operator of the system at a single host computer. In addition, this bi-directional communication may provide the operator functional control over the solar tracking devices from this same host computer. Embodiments of the present invention may provide a distributed network system that allows status from a plurality of tracking controllers to be monitored and analyzed, and also allows site specific information (e.g. date and time) to be propagated to all or some plurality of the tracking controllers.

In an embodiment including a mesh network, a site is shown that would be suitable for use of the wireless mesh communications network. This site may contain more than one of a solar tracking device. A tracking device may include actuators, sensors, mechanisms, and computing. The tracking device may be used to orient a tracking payload with respect to the sun (and hence to the electromagnetic radiation incident from the sun).

In another embodiment including a mesh network, a solar tracking device includes thereon a mounted a tracking controller. The tracking controller is responsible for computing both the position of the sun and the desired orientation of the tracking payload based on variables such as date, time, latitude, and longitude. Based on the results of these calculations, the tracking controller can control actuators of the tracking device (possibly using sensors of the tracking device for this task). In this embodiment, the tracking payload is shown as an array of solar panels.

In another embodiment including a mesh network data communication paths are available. For example, a host computer communicates via a communication channel to a host gateway. The host gateway in turn communicates with a network manager. Finally, a network manager communicates with the tracking controller via a wireless mesh communications network. In this embodiment, a base station houses both the host gateway and the network manager.

The wireless mesh network may allow the tracking controllers to be operated and monitored from a convenient (possibly remote) location while allowing those tracking controllers to be physically located nearby to the tracking devices. The tracking controllers, for example, may be mounted immediately to some part of the structure of the tracking device. The tracking controller, in an embodiment, can communicate with the host computer via a wireless mesh communications network. The wireless network frequency range used in this embodiment is within the Ultra High Frequency (UHF) band, preferably 902-928 megahertz and/or 2.4 gigahertz radio frequency (RF). Other embodiments of this invention can use other RF ranges, for example in the Very High Frequency (VHF) band or the Super High Frequency (SHF) band. The wireless mesh communications network in this embodiment uses modulation technology in order to make the system more robust to radio frequency interference (RFI). In an embodiment, this technology is direct-sequence spread spectrum (DSSS), but in other embodiments can be similar technologies, for instance Frequency-hopping spread spectrum (FHSS).

The tracking controller and network manager may use a medium to high range RF transceiver (capable of communications of up to approximately one mile in open air) to allow formation of wireless mesh communications network. The host gateway may in turn communicate with the host computer via some communication channel. The communication channel may be accomplished, for example, with WAN, LAN, Internet, satellite, serial bus, or other appropriate communication technology, or combination of such technologies. It would not be unusual, for instance at a small solar electric power plant, for the host gateway to be plugged into a communication bus available on the host computer (e.g. USB or PCI). At a large solar electric power plant, it may be possible to connect the host gateway to the host computer via wireless LAN technology, for instance 802.11g, Zigbee, WiMax, or cell phone standards (e.g. 3G). This may allow location of the host gateway to be somewhat flexible, the only constraint that the network manager (included in the base station in this embodiment) must be within radio reception range of at least one tracking controller.

The host gateway may collect information from the tracking controller and may transmit that information, preferably in batch format, to the host computer either when requested or at some interval. The host gateway may also determine that unsolicited communication is necessary, and can initiate communication with the host computer based on some event detected by the network manager or the tracking controller. For example, the network manager may detect some systemic network problem that requires immediate attention or the tracking controller may detect some problem with the tracking device that requires immediate attention. In these examples, the host gateway may asynchronously initiate communications with the host computer, and these communications may generate arbitrary actions on the host computer, for example database entries or emails/pages to maintenance personnel. Finally, the host gateway collects control information from the host computer and controls at a top level its transmission over the wireless mesh communications network to the tracking controller.

In another aspect of the present invention, solar tracking apparatuses are described. FIG. 2A illustrates a block diagram of a solar tracking apparatus, in accordance with an embodiment of the present invention. FIG. 2B illustrates a solar tracking apparatus moved from a first position, X, to a second position, Y, in accordance with an embodiment of the present invention. Likewise, FIG. 2C illustrates a solar tracking apparatus moved from a first position, X, to a second position, Y, in accordance with an embodiment of the present invention.

Referring to FIG. 2A, an apparatus 200 includes a solar tracking apparatus 202 and a module 204 coupled to solar tracking apparatus 202. Module 204 is configured to perform a method. The method includes determining a minimum amount of energy 206 required to move solar tracking apparatus 202 from a first position to a second position. The method also includes estimating an available radiance for a solar resource 208 coupled to solar tracking apparatus 202. The method also includes moving solar tracking apparatus 202 from the first position to the second position prior to a point in time when the energy derivable from the available radiance for solar resource 208 is less than the minimum amount of energy 206 required to move solar tracking apparatus 202 from the first position to the second position.

In an embodiment, the estimating includes the use of weather prediction techniques. In one embodiment, apparatus 200 further includes a receiver 210 coupled to solar tracking apparatus 202. A weather prediction is communicated to receiver 210. In a specific embodiment, the weather prediction is communicated by using a mesh network, as described above. In an embodiment apparatus 200 further includes an auxiliary power source module 212 coupled to solar tracking apparatus 202. In an alternative embodiment, however, solar tracking apparatus 202 is not equipped with an auxiliary power source module. In an embodiment, apparatus 200 further includes one or more modules of concentrator solar cells 214, and solar tracking apparatus 202 supports the one or more modules of concentrator solar cells 214. In an embodiment, one or more non-concentrator solar cells 216 are coupled to solar tracking apparatus 202, and solar resource 208 includes the one or more non-concentrator solar cells 216.

In accordance with an embodiment of the present invention, the second position is a stow position. For example, referring to FIG. 2B, a minimum amount of energy required to move a solar tracking apparatus 202B from a first position, X, to a second position (stow position), Y, is determined. An available radiance is estimated for a solar resource coupled to solar tracking apparatus 202B. Solar tracking apparatus 202B is then moved from the first position, X, to the second position, Y, prior to a point in time when the energy derivable from the available radiance for solar resource is less than the minimum amount of energy required to move solar tracking apparatus 202B from the first position, X, to the second position, Y. In another example, referring to FIG. 2C, a minimum amount of energy required to move a solar tracking apparatus 202C from a first position, X, to a second position (stow position), Y, is determined. An available radiance is estimated for a solar resource coupled to solar tracking apparatus 202C. Solar tracking apparatus 202C is then moved from the first position, X, to the second position, Y, prior to a point in time when the energy derivable from the available radiance for solar resource is less than the minimum amount of energy required to move solar tracking apparatus 202C from the first position, X, to the second position, Y.

In an aspect of the present invention, embodiments of the inventions are provided as a computer program product, or software product, that includes a machine-readable medium having stored thereon instructions, which is used to program a computer system (or other electronic devices) to perform a process or method according to embodiments of the present invention. A machine-readable medium may include any mechanism for storing or transmitting information in a form readable by a machine (e.g., a computer). For example, in an embodiment, a machine-readable (e.g., computer-readable) medium includes a machine (e.g., a computer) readable storage medium (e.g., read only memory ("ROM"), random access memory ("RAM"), magnetic disk storage media or optical storage media, flash memory devices, etc.).

Figure 3:
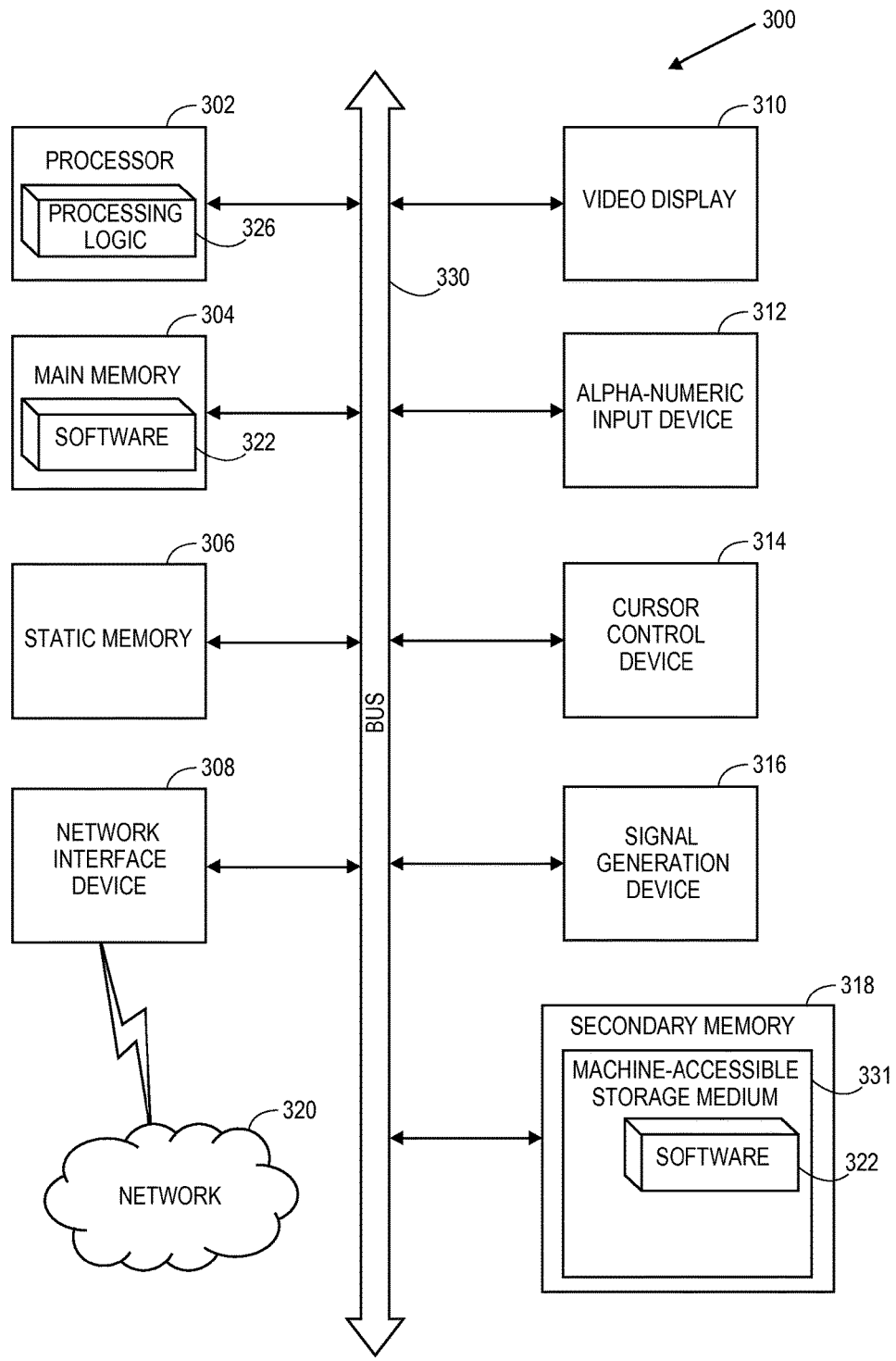
FIG. 3 illustrates a block diagram of an example of a computer system configured for performing a method of operating a solar tracking apparatus, in accordance with an embodiment of the present invention.

FIG. 3 illustrates a diagrammatic representation of a machine in the form of a computer system 300 within which a set of instructions, for causing the machine to perform any one or more of the methodologies discussed herein, is executed. For example, in accordance with an embodiment of the present invention, FIG. 3 illustrates a block diagram of an example of a computer system configured for performing a method of operating a solar tracking apparatus. In alternative embodiments, the machine is connected (e.g., networked) to other machines in a Local Area Network (LAN), an intranet, an extranet, or the Internet. In an embodiment, the machine operates in the capacity of a server or a client machine in a client-server network environment, or as a peer machine in a peer-to-peer (or distributed) network environment. In an embodiment, the machine is a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers or processors) that individually or jointly execute a set (or multiple sets) of instructions to perform any one or more of the methodologies discussed herein.

The example of a computer system 300 includes a processor 302, a main memory 304 (e.g., read-only memory (ROM), flash memory, dynamic random access memory (DRAM) such as synchronous DRAM (SDRAM), etc.), a static memory 306 (e.g., flash memory, static random access memory (SRAM), etc.), and a secondary memory 318 (e.g., a data storage device), which communicate with each other via a bus 330. In an embodiment, a data processing system is used.

Processor 302 represents one or more general-purpose processing devices such as a microprocessor, central processing unit, or the like. More particularly, in an embodiment, the processor 302 is a complex instruction set computing (CISC) microprocessor, reduced instruction set computing (RISC) microprocessor, very long instruction word (VLIW) microprocessor, processor implementing other instruction sets, or processors implementing a combination of instruction sets. In one embodiment, processor 302 is one or more special-purpose processing devices such as an application specific integrated circuit (ASIC), a field programmable gate array (FPGA), a digital signal processor (DSP), network processor, or the like. Processor 302 executes the processing logic 326 for performing the operations discussed herein.

In an embodiment, the computer system 300 further includes a network interface device 308. In one embodiment, the computer system 300 also includes a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

In an embodiment, the secondary memory 318 includes a machine-accessible storage medium (or more specifically a computer-readable storage medium) 331 on which is stored one or more sets of instructions (e.g., software 322) embodying any one or more of the methodologies or functions described herein, such as a method for managing variability of output from a photovoltaic system. In an embodiment, the software 322 resides, completely or at least partially, within the main memory 304 or within the processor 302 during execution thereof by the computer system 300, the main memory 304 and the processor 302 also constituting machine-readable storage media. In one embodiment, the software 322 is further transmitted or received over a network 320 via the network interface device 308.

While the machine-accessible storage medium 331 is shown in an embodiment to be a single medium, the term "machine-readable storage medium" should be taken to include a single medium or multiple media (e.g., a centralized or distributed database, or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of embodiments of the present invention. The term "machine-readable storage medium" shall accordingly be taken to include, but not be limited to, solid-state memories, and optical and magnetic media.

In accordance with an embodiment of the present invention, a machine-accessible storage medium has instructions stored thereon which cause a data processing system to perform a method of operating a solar tracking apparatus. The method includes determining a minimum amount of energy required to move the solar tracking apparatus from a first position to a second position. The method also includes estimating an available radiance for a solar resource coupled to the solar tracking apparatus. The method also includes moving the solar tracking apparatus from the first position to the second position prior to a point in time when the energy derivable from the available radiance is less than the minimum amount of energy required to move the solar tracking apparatus from the first position to the second position.

In one embodiment, the second position is a stow position. In one embodiment, the estimating includes the use of weather prediction techniques. In a specific embodiment, a weather prediction is communicated to a receiver coupled to the solar tracking apparatus. In a particular embodiment, the weather prediction is communicated by using a mesh network. In one embodiment, the solar tracking apparatus is coupled to an auxiliary power source module. In one embodiment, the solar tracking apparatus is not equipped with an auxiliary power source module. In one embodiment, the solar tracking apparatus supports one or more modules of concentrator solar cells, and the solar resource includes one or more non-concentrator solar cells also coupled to the solar tracking apparatus.

It is to be understood that in some embodiments of the present invention where concentrator-type solar cells are supported by a tracking device, some of the above described arrangements may not be immediately straight forward to implement. For example, concentrator cells may cut-off their own access to insolation upon return to, e.g., a stow state, based on the magnification properties of the concentrator-type solar cells. That is, the "roll-off" effect as the cells are oriented further and further away from the direct angle to the sun may be more substantial for concentrator-type solar cells as opposed to more conventional solar cells. As such, in accordance with an embodiment of the present invention, a traditional DC module is appended to a module of concentrator solar cells to enable one or more of the embodiments of the present invention. In one embodiment, a crystalline photovoltaic (PV) panel or a thin-film panel is added is appended to a module of concentrator solar cells to reduce roll-off effects that may hamper certain embodiment of the present invention.

Thus, methods of operating solar tracking apparatuses have been disclosed. In accordance with an embodiment of the present invention, a method includes determining a minimum amount of energy required to move the solar tracking apparatus from a first position to a second position. The method also includes estimating an available radiance for a solar resource coupled to the solar tracking apparatus. The method also includes moving the solar tracking apparatus from the first position to the second position prior to a point in time when the energy derivable from the available radiance is less than the minimum amount of energy required to move the solar tracking apparatus from the first position to the second position. In one embodiment, the second position is a stow position. In one embodiment, the estimating includes the use of weather prediction techniques. In one embodiment, the solar tracking apparatus supports one or more modules of concentrator solar cells, and the solar resource includes one or more non-concentrator solar cells also coupled to the solar tracking apparatus.

What is claimed is:

1. An apparatus comprising:
   a solar tracking apparatus including a motor to move the solar tracking apparatus from a current position to a stow position; and
   a module coupled to the solar tracking apparatus, the module configured to:
      estimate, based on information about the motor, a minimum amount of electrical energy required by the motor to move the solar tracking apparatus from the current position at a current time to the stow position at a future time;

estimate a future amount of electrical energy derivable between the current time and the future time from an available, but not yet received, radiance for a solar resource coupled to the solar tracking apparatus; and move, in response to the minimum amount of electrical energy required by the motor being equal to the future amount of electrical energy derivable, the solar tracking apparatus from the current position to the stow position.

2. The apparatus of claim 1, wherein the estimated future amount of electrical energy derivable from the available, but not yet received, radiance is based on a weather prediction.

3. The apparatus of claim 2, further comprising:
a receiver coupled to the module, wherein the weather prediction is communicated to the receiver.

4. The apparatus of claim 3, wherein the weather prediction is communicated by a mesh network.

5. The apparatus of claim 1, further comprising:
an auxiliary power source module coupled to the solar tracking apparatus.

6. The apparatus of claim 1, wherein the solar tracking apparatus is not equipped with an auxiliary power source module.

7. The apparatus of claim 1, further comprising:
one or more modules of concentrator solar cells, wherein the solar tracking apparatus supports the one or more modules of concentrator solar cells; and
one or more non-concentrator solar cells coupled to the solar tracking apparatus, wherein the solar resource comprises the one or more non-concentrator solar cells.

8. A non-transitory machine-accessible storage medium having instructions stored thereon that are executable by a data processing system to perform:
estimating, based on information about a motor of a solar tracking apparatus, a minimum amount of electrical energy required by the motor to move a solar tracking apparatus from a current position at a current time to a stow position at a future time;
estimating a future amount of electrical energy derivable between the current time and the future time from an available, but not yet received, radiance for a solar resource coupled to the solar tracking apparatus from a second received signal; and
sending a signal, in response to the minimum amount of electrical energy required by the motor being equal to the future amount of electrical energy derivable, to move the solar tracking apparatus from the current position to the stow position.

9. The non-transitory machine-accessible storage medium of claim 8, wherein estimating the future amount of electrical energy derivable from the available, but not yet received, radiance comprises the use of weather prediction techniques.

10. The non-transitory machine-accessible storage medium of claim 9, wherein a weather prediction is communicated to a receiver coupled to the solar tracking apparatus.

11. The non-transitory machine-accessible storage medium of claim 10, wherein the weather prediction is communicated by using a mesh network.

12. The non-transitory machine-accessible storage medium of claim 8, wherein the solar tracking apparatus is coupled to an auxiliary power source module.

13. The non-transitory machine-accessible storage medium of claim 8, wherein the solar tracking apparatus is not equipped with an auxiliary power source module.

14. The non-transitory machine-accessible storage medium of claim 8, wherein the solar tracking apparatus supports one or more modules of concentrator solar cells, and wherein the solar resource comprises one or more non-concentrator solar cells also coupled to the solar tracking apparatus.

* * * * *